Nov. 18, 1941.　　E. G. BECKEY ET AL　　2,262,879
MATERIAL CONVEYER
Filed July 10, 1940　　2 Sheets-Sheet 1
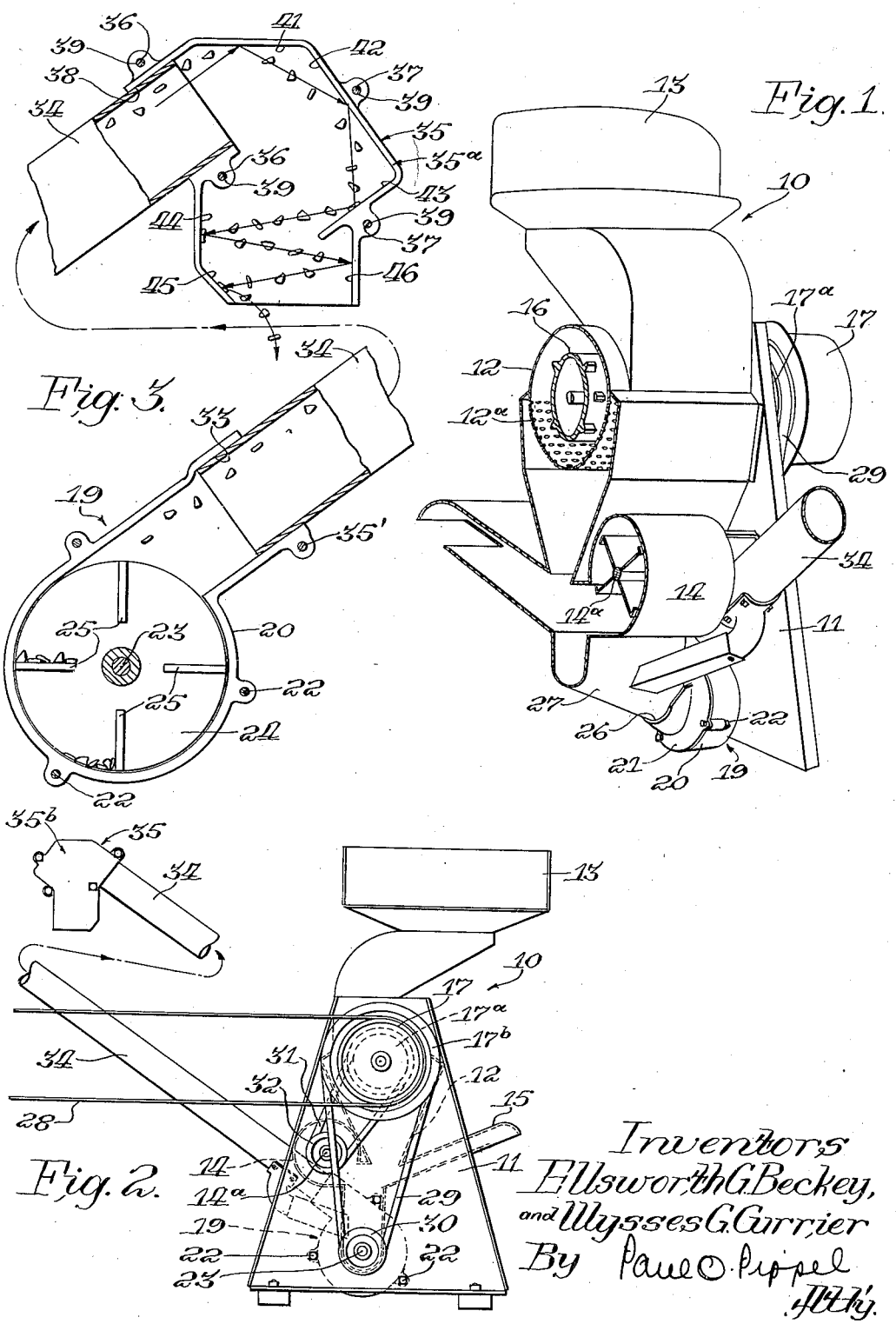

Nov. 18, 1941.    E. G. BECKEY ET AL    2,262,879
MATERIAL CONVEYER
Filed July 10, 1940    2 Sheets-Sheet 2
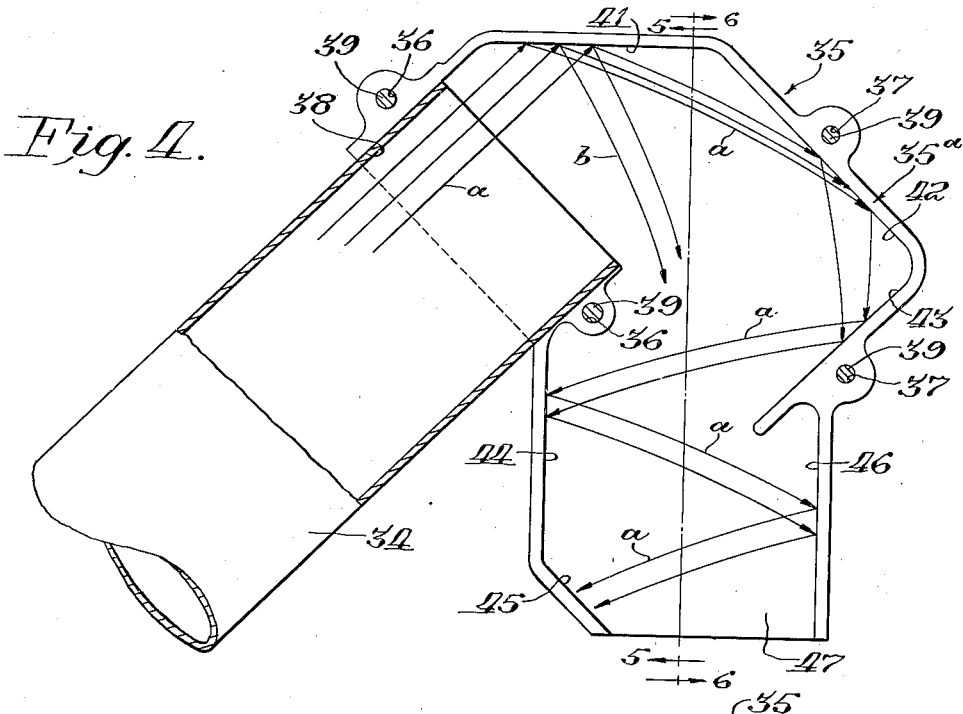
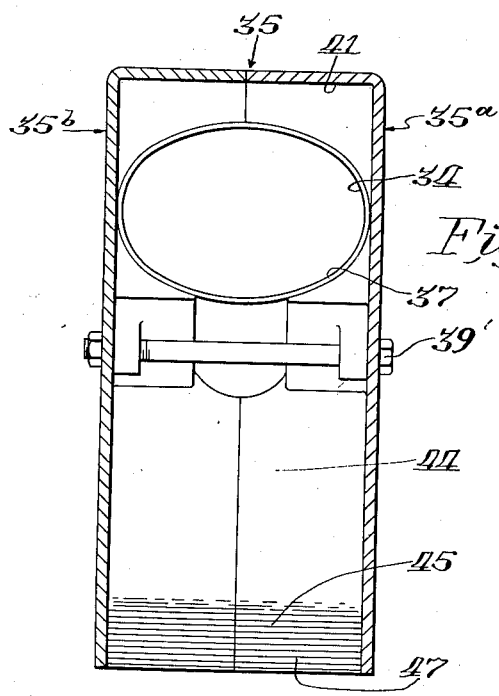
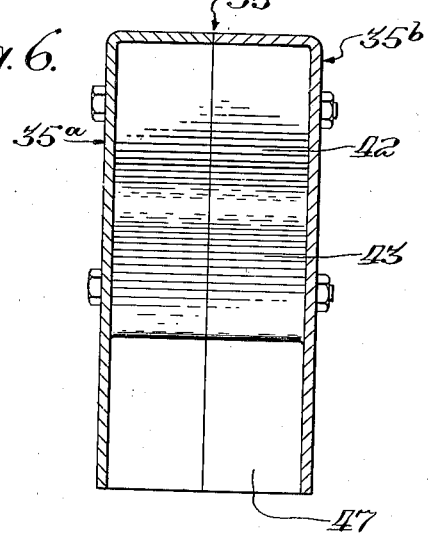
Inventors
Ellsworth G. Beckey
and Ulysses G. Currier.
By Paul O. Pippel
Atty Patented Nov. 18, 1941

2,262,879

UNITED STATES PATENT OFFICE 2,262,879

MATERIAL CONVEYER

Ellsworth G. Beckey, Sterling, and Ulysses Grant Currier, La Grange, Ill., assignors to International Harvester Company, a corporation of New Jersey Application July 10, 1940, Serial No. 344,746

4 Claims. (Cl. 302—59)

The present invention relates to a material conveyer. More specifically the invention relates to a material impeller for conveying material at a given velocity to a desired point, and to means for reducing the velocity of the material as it is ejected from the impeller.

It is desirable when shelling corn to be able to convey the corn from the sheller to a wagon or crib. The most efficient way of conveying the corn is by a corn impeller which moves the corn at a given velocity through a hollow conducting member to its destination. However, it is not practical to eject the corn at this given velocity from the hollow conducting member.

It is, therefore, the principal object of the present invention to provide a device which is simple and inexpensive to manufacture and which will reduce the velocity of the corn and discharge it from the device at a steady, even flow.

Other objects and advantages of the present invention will be apparent to those skilled in the art after a careful consideration of the following detailed description of the preferred structural embodiment, taken in conjunction with the accompanying drawings.

In the drawings:

Figure 1 is a perspective view of a corn sheller having a corn impeller;

Figure 2 is a side view of the corn sheller;

Figure 3 is a sectional view of the corn impeller and the discharge retarding spout;

Figure 4 is an enlarged view of the discharge retarding spout;

Figure 5 is a sectional view taken along the line 5—5 of Figure 4; and,

Figure 6 is a sectional view taken along the line 6—6 of Figure 4.

Referring now to the drawings, and more particularly to Figures 1 and 2, it will be seen that the sheller 10 consists of frame members 11, between which is secured a shelling cage 12 having openings 12a at the lower portion thereof, and a hopper 13 associated with the top of the cage 12. A fan 14 having a drive shaft 14a is connected at one side of the cage 12, and a fan outlet duct 15 is provided at the other side of the cage 12. A rotatable shelling cylinder 16 is provided within the cage 12 and is journaled in the frame members 11. A plurality of pulleys 17, 17a, and 17b, are secured at one end of the cylinder 16.

A corn impeller 19, which consists of impeller housing members 20 and 21, is held together and secured to one of the frame members 11 by means of bolts 22. Within the impeller 19 is journaled a shaft 23 on which is secured an annular disk 24, which is provided with a plurality of blades 25. As shown in Figure 1, the housing member 21 is provided with a flanged opening 26. A chute 27, positioned beneath the cage 12 adjacent the fan 14 and the fan outlet duct 15, is associated with the flanged opening 26 of the impeller housing member 21.

The shelling cylinder is driven by a belt 28 which is trained over the pulley 17 and over any suitable source of power, not shown. A belt 29, trained over the pulley 17b and over a pulley 30 fixed to the shaft 23, drives the impeller 19. A belt 31, trained over the pulley 17a and over a pulley 32 on the fan shaft 14a, drives the fan 14. The impeller 19 is driven at a high rate of speed, which is in this case 1800 R. P. M.

As shown in Figure 3, the impeller 19 is provided with an opening 33 in which a hollow conducting member in the form of a pipe 34 is inserted and secured by a bolt 35'. The pipe 34 extends angularly upwardly and has at the end thereof a velocity reducing means or retarder 35. The retarder 35 consists of mating sections 35a and 35b, which are provided with alined openings 36 and 37. An opening 38 is provided in the retarder 35 in which the pipe 34 is inserted and secured by bolts 39 provided in the alined opening 36.

The retarder 35 consists of a first deflecting surface 41, which is disposed at an angle over the open end of the pipe 34. A second deflecting surface 42 is positioned at an angle to the first deflecting surface 41, and a third deflecting surface is positioned at approximately a right angle to the second deflecting surface 42. A fourth deflecting surface 44 extends from the lower portion of the opening 38 and is positioned approximately at right angles to the first deflecting surface 41, and a fifth deflecting surface 45 is positioned at an angle to the fourth deflecting surface 44 and is arranged approximately perpendicular to the third deflecting surface 43. A sixth deflecting surface 46 is spaced from the fourth deflecting surface 44 and is positioned approximately parallel thereto. The fifth and sixth deflecting surfaces terminate to form an opening 47 through which the grain falls.

When the sheller is in operation, the ears of corn are put into the hopper 13, from which they fall into the shelling cage 12 where they are acted upon by the shelling cylinder 16. The shelled corn falls through the openings 12a in the shelling cage 12 into the chute 27 which directs the corn into the impeller 19. As the corn falls into the chute 27, the fan directs a blast of air through the corn and removes any foreign particles therefrom. As previously explained, the impeller 19 is driven at a high rate of speed and, as the corn is fed into the impeller, the impeller impels the corn at a high velocity through the hollow conducting member 34. The corn must be impelled at this high velocity in order to move it through the length of the hollow conducting member; however, it is obvious that the corn could not be discharged from the hollow conducting member into a container at this high velocity. In order to discharge the corn at a reduced velocity, the retarder 35 is associated with the end of the hollow conducting member 34.

Referring to Figure 4, the arrows a indicate generally the path of the corn. As the corn comes out of the hollow conducting member 34, the corn strikes the deflecting surface 41, which deflects it onto the deflecting surface 42, thence onto the deflecting surface 43, thence onto the deflecting surface 44, from which it is deflected to the deflecting surfaces 46 and 45.

The impact of the corn against the deflecting surfaces 41, 42, 43, 44, 45, and 46 reduces the velocity of the corn. Since there is no appreciable air flow generated by the impeller 19, the corn, after it has struck one deflecting surface, will bound off and strike another deflecting surface. As shown in Figure 4, after the corn has struck the first deflecting surface 41, some of the corn is deflected vertically downwardly between the deflecting surfaces 42, 43, 44, 45, and 46. Some of the corn, however, will bound off of the first deflecting surface in the direction indicated by the arrows b. The velocity of this corn will be reduced by its contact with the corn which is deflected vertically downwardly in the path of the arrows a. After the corn has impinged the deflecting surfaces, the velocity of the corn is reduced to a point where it will flow by gravity at a steady, even flow through the opening 47 in the retarder 35.

From the foregoing description it is obvious that a novel velocity reducing means has been provided for a corn impeller. The deflecting surfaces of the retarder reduce the velocity of the corn and prevent cracking of the corn. The retarder is simple and inexpensive to manufacture. It is to be understood that numerous modifications and alterations may be made in the preferred form of the construction illustrated and described without departing from the spirit and scope of the invention as defined in the appended claims.

What is claimed is:

1. A conveyer system for grain or the like comprising an upwardly inclined pipe through which grain is blown at various velocities, said system embodying retarding means including an initial baffle means spaced from the discharge end of the pipe and angularly disposed to deflect the grain discharged thereagainst downwardly thereby changing the direction of the grain and reducing the kinetic energy content thereof whereby some of the grain falls downwardly in a substantially vertical stream, and a plurality of additional baffle means having deflecting elements positioned angularly with respect to the initial baffle means and to one another on opposite sides of said vertical stream of grain whereby the grain continuing to rebound against the additional baffle means is deflected across the vertical stream of grain thereby reducing the kinetic energy of all of the grain to the degree that it falls downwardly by gravity.

2. A conveyer system for grain or the like comprising an upwardly inclined pipe through which grain is blown at various velocities, said system embodying retarding means including an initial baffle means spaced from the discharge end of the pipe and angularly disposed to deflect the grain discharged thereagainst downwardly thereby changing the direction of the grain and reducing the kinetic energy content thereof whereby some of the grain falls downwardly in a substantially vertical stream, and a plurality of additional baffle means having deflecting elements positioned angularly with respect to the initial baffle means and to one another on opposite sides of said vertical stream of grain whereby the grain continuing to rebound against the additional baffle means after contacting the initial baffle means is deflected in a plurality of zigzag passes across the vertical stream of grain thereby reducing the kinetic energy of all of the grain to the degree that it falls downwardly by gravity.

3. A conveyer system for corn shellers or the like, comprising an upwardly inclined pipe through which corn is adapted to be blown at various velocities, a retarding means extending downwardly from the end of the pipe, baffle means disposed between the end of the pipe and the retarding means for directing the corn into the retarding means, and baffles on opposite sides of the downwardly extending retarding means and so arranged as to provide a vertical passageway, whereby some of the corn falling downwardly from the baffle means into the vertical passageway is retarded by contact with the corn rebounding from the baffles on opposite sides of the downwardly extending retarding means.

4. A conveyer system for corn shellers or the like, comprising an upwardly inclined pipe through which corn is adapted to be blown at various velocities, a retarding means extending downwardly from the end of the pipe, baffle means disposed between the end of the pipe and the retarding means for directing the corn into the retarding means, and baffles on opposite sides of the downwardly extending retarding means and so arranged as to provide a vertical passageway and to direct the corn fore and aft of the passageway, whereby some of the corn falling downwardly from the baffle means into the vertical passageway is retarded by contact with the corn rebounding from the baffles on opposite sides of the downwardly extending retarding means.

ELLSWORTH G. BECKEY.
ULYSSES GRANT CURRIER.